(12) United States Patent
Naruse et al.

(10) Patent No.: US 8,736,221 B2
(45) Date of Patent: May 27, 2014

(54) DIRECT-CURRENT TO THREE-PHASE ALTERNATING-CURRENT INVERTER SYSTEM

(75) Inventors: Takuya Naruse, Aichi-ken (JP); Kazuki Najima, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 232 days.

(21) Appl. No.: 13/075,905

(22) Filed: Mar. 30, 2011

(65) Prior Publication Data

US 2011/0241587 A1 Oct. 6, 2011

(30) Foreign Application Priority Data

Mar. 31, 2010 (JP) ................................. 2010-081483

(51) Int. Cl.
*H02P 27/04* (2006.01)

(52) U.S. Cl.
USPC ........... 318/801; 318/727; 318/761; 318/798; 318/800

(58) Field of Classification Search
USPC .................. 318/727, 761, 798, 799, 800, 801
See application file for complete search history.

(56) References Cited

U.S. PATENT DOCUMENTS

| | | | | |
|---|---|---|---|---|
| 6,014,001 | A * | 1/2000 | Guinet ........................ | 318/701 |
| 7,190,143 | B2 * | 3/2007 | Wei et al. ..................... | 318/606 |
| 8,179,066 | B2 * | 5/2012 | Terorde ....................... | 318/400.2 |
| 2006/0267542 | A1 * | 11/2006 | Wei et al. ..................... | 318/807 |
| 2009/0322273 | A1 * | 12/2009 | Kallioniemi et al. ......... | 318/503 |
| 2010/0026220 | A1 | 2/2010 | Sakai | |
| 2010/0171456 | A1 * | 7/2010 | Chakrabarti et al. ......... | 318/461 |
| 2011/0101906 | A1 * | 5/2011 | Tagome ........................ | 318/722 |
| 2012/0019184 | A1 * | 1/2012 | Niizuma ....................... | 318/494 |
| 2012/0235604 | A1 * | 9/2012 | Takano et al. ................. | 318/139 |

FOREIGN PATENT DOCUMENTS

| | | |
|---|---|---|
| CN | 1206242 A | 1/1999 |
| CN | 101595632 A | 12/2009 |
| JP | 10-337047 A | 12/1998 |
| JP | 2002-272183 A | 9/2002 |
| JP | 2005-269722 A | 9/2005 |
| JP | 2007-274880 A | 10/2007 |
| JP | 2008-206293 A | 9/2008 |
| JP | 2008-259314 A | 10/2008 |
| JP | 2009-291019 A | 12/2009 |

OTHER PUBLICATIONS

Chinese Office Action dated May 31, 2013 issued in counterpart Chinese Application No. 201110083680.4.

* cited by examiner

*Primary Examiner* — Kawing Chan
(74) *Attorney, Agent, or Firm* — Sughrue Mion, PLLC

(57) ABSTRACT

A direct-current to three-phase alternating-current inverter system includes a three-phase motor, a plurality of switching elements, an inverter circuit for the three-phase motor, a capacitor, a direct-current power source and a control circuit. The switching elements arranged in the inverter circuit serve as upper and lower arms for the respective three phases of the three-phase motor, respectively. The capacitor is connected in parallel to the respective pairs of the upper and lower arms. The direct-current power source is arranged between the neutral-point of the three-phase motor and the respective lower arms or the respective upper arms. The control circuit controls the switching elements such that at least the switching frequency of one pair of the switching elements for one phase through which the current having the greatest value flows is lower than the switching frequencies of the other pairs of the switching elements for the other phases.

3 Claims, 3 Drawing Sheets

DIRECT-CURRENT TO THREE-PHASE ALTERNATING-CURRENT INVERTER SYSTEM

BACKGROUND OF THE INVENTION

The present invention relates to a direct-current to three-phase alternating-current inverter system (hereinafter referred to as "DC to three-phase AC inverter system") in which a direct-current power source (hereinafter referred to as "DC power source") is connected to a three-phase motor at a neutral-point thereof.

When the direct-current voltage (hereinafter referred to as "DC voltage") is decreased in an inverter circuit for a three-phase motor, the inverter circuit requires a large current for obtaining the same output voltage as that outputted before the DC voltage is decreased. To meet this requirement, a switching element having a high current rating or a booster circuit may be arranged in the inverter circuit. If such measures are taken, the size of the switching element is increased, and a booster circuit is required to be added to the inverter circuit, so that the size of the inverter circuit becomes large thereby to increase the cost of the inverter circuit.

In order to solve the problem, a DC to three-phase AC inverter is proposed, for example, by Japanese Patent Application Publication No. 10-337047, in which the voltage of the DC power source connected to the neutral-point of the three-phase motor is boosted thereby to charge the capacitor, and the DC power of the capacitor is converted into the three-phase AC power to be supplied to the three-phase motor. In the DC to three-phase AC inverter system disclosed in the above Publication, both of the inverter operation and the boost operation may be accomplished by performing the boost operation in the region of the zero-voltage vector of the inverter operation. Thus, a large-sized switching element for large current application is not required for the inverter circuit. In the DC to three-phase AC inverter system, the zero-phase inductance of the three-phase motor may serve as a reactor for the boost operation, so that a booster circuit is not required to be added in the DC to three-phase AC inverter system other than the inverter circuit.

For reducing the switching loss in the DC to three-phase AC inverter system, the switching frequency of the switching elements for each phase is required to be decreased.

In the DC to three-phase AC inverter system, when the switching frequency of the switching elements for each phase is decreased, the current ripple that is the zero-phase current ripple made by combining the switching ripples of the respective phases or the ripple of current flowing at the neutral-point of the three-phase motor is increased, so that there is a fear that the controllability of the boost operation is deteriorated. Therefore, the present invention is directed to providing a DC to three-phase AC inverter system in which a DC power source is is connected to a three-phase motor at a neutral-point thereof and which reduces both of the switching loss and the zero-phase current ripple.

SUMMARY OF THE INVENTION

In accordance with the present invention, a DC to three-phase AC inverter system includes a three-phase motor, an inverter circuit for the three-phase motor, a plurality of switching elements, a capacitor, a direct-current power source and a control circuit. The three-phase motor has three phases. The switching elements are arranged in the inverter circuit. The switching elements respectively serve as upper arms and lower arms for the respective three phases of the three-phase motor. The capacitor is connected in parallel to the respective pairs of the upper and lower arms. The direct-current power source is arranged between the neutral-point of the three-phase motor and the respective lower arms or the respective upper arms. The control circuit controls switching operation of the switching elements such that at least the switching frequency of the switching elements for one phase through which the current having the greatest value flows is lower than the switching frequencies of the other pairs of the switching elements for the other phases.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
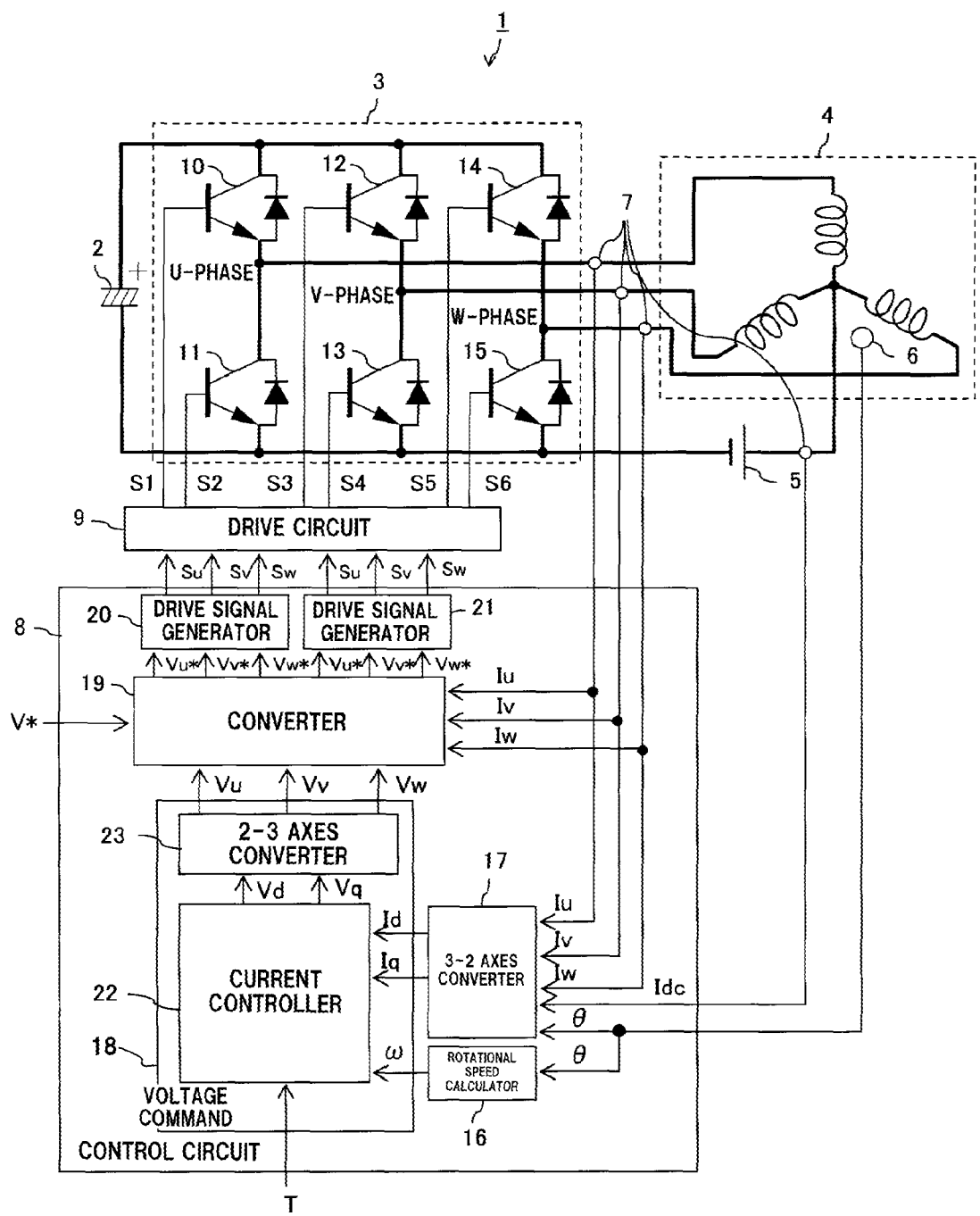
FIG. 1 is a circuit diagram showing a DC to three-phase AC inverter system according to a preferred embodiment of the present invention.
Figure 2:
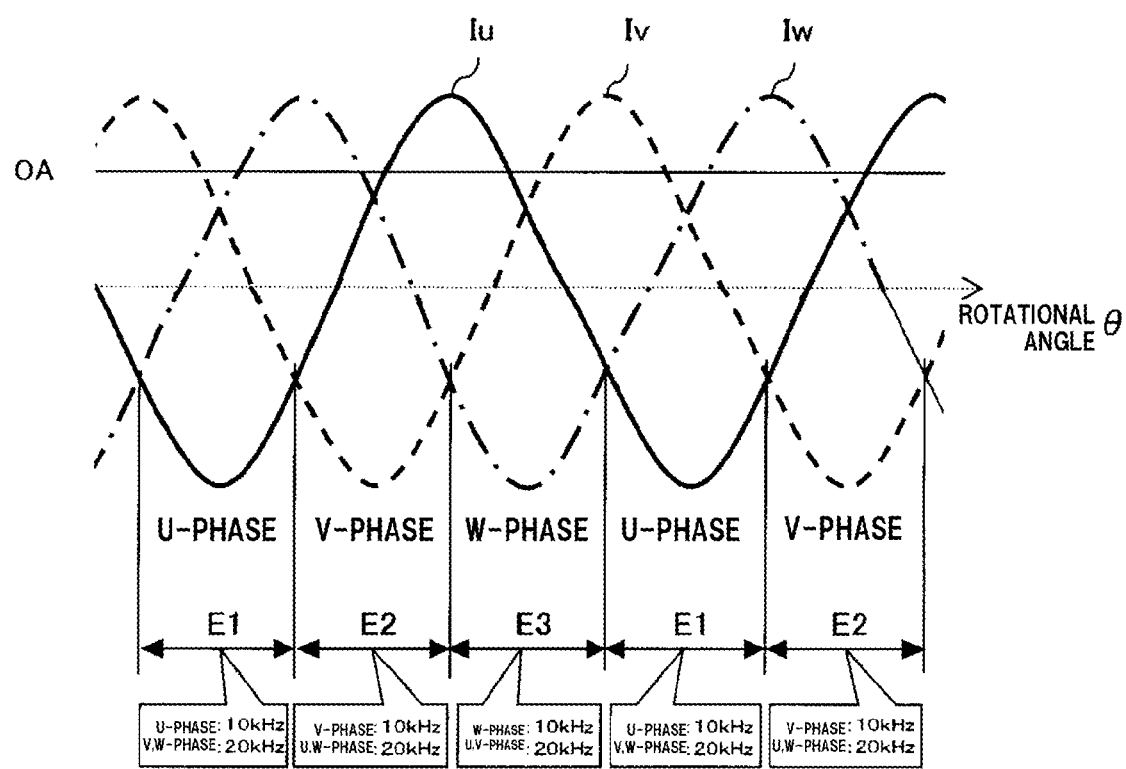
FIG. 2 is a timing chart showing currents Iu, Iv, Iw in the DC to three-phase AC inverter system of FIG. 1.
Figure 3:
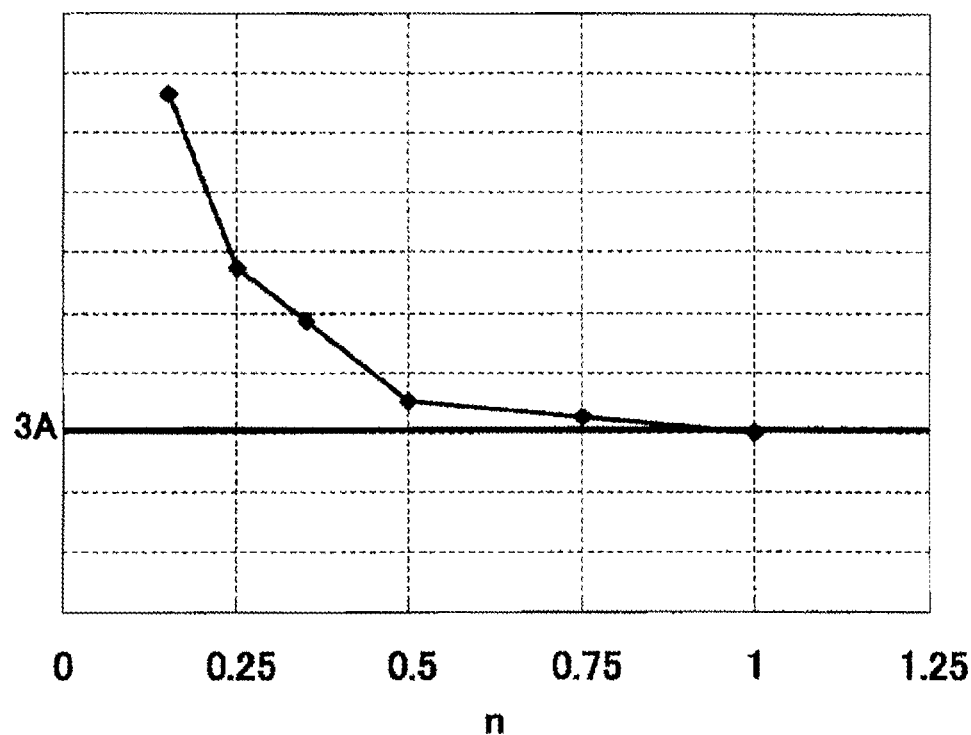
FIG. 3 is a graph showing a relation between frequency n of a triangle wave T1 and amplitude of a composite wave Y in the DC to three-phase AC inverter system of FIG. 1.

The following will describe a DC to three-phase AC inverter system according to a preferred embodiment of the present invention with reference to FIGS. 1 through 3. The DC to three-phase AC inverter system is designated generally by reference numeral 1, including a capacitor 2, an inverter circuit 3, a three-phase motor 4 such as the one for a compressor, a DC power source 5, a rotation angle sensor 6, such as a resolver or an encoder, a current sensor 7, a control circuit 8 such as central processing unit (CPU), and a drive circuit 9. The DC to three-phase AC inverter system 1 may dispense with the rotation angle sensor 6, and it may be so arranged that the rotation angle is determined by calculation, that is "sensorless controlled".

The inverter circuit 3 for the three-phase motor 4 having three phases of U-phase, V-phase and W-phase includes six switching elements 10 through 15, such as a metal-oxide semiconductor field-effect transistor (MOSFET) or a bipolar transistor with which a diode is connected in parallel. The switching elements 10, 11 are connected in series to each other and respectively serve as the upper and lower arms for the U-phase of the three-phase motor 4. The switching elements 12, 13 are connected in series to each other and respectively serve as the upper and lower arms for the V-phase of the three-phase motor 4. The switching elements 14, are connected in series to each other and respectively serve as the upper and lower arms for the W-phase of the three-phase motor 4. The pairs of the switching elements 10, 11, the switching elements 12, 13 and the switching elements 14, 15 is are connected in parallel to one another and connected to the capacitor 2. In other words, the capacitor 2 is connected in parallel to the respective pairs of the switching elements 10, 11, the switching elements 12, 13 and the switching elements 14, 15. The low voltage terminals of the switching elements 11, 13, 15 serving as the lower arms for the respective phases are connected to the negative terminal of the DC power source 5, and the positive terminal of the DC power source 5 is connected to the neutral-point of the three-phase motor 4.

When the respective switching elements 10 through 15 are turned on and off according to drive signals S1 through S6 from the drive circuit 9, the DC power from the capacitor 2 is converted to the three-phase AC power in which the three phases are shifted by 120 degrees from one another, and then the three-phase AC power is supplied to and drive the three-phase motor 4. When a current is flowing at the neutral-point of the three-phase motor 4 in the same direction as the discharging direction of the DC power of the DC power source 5 and any one of the switching elements 11, 13, 15 serving as the lower arm for one phase is turned on, energy from the DC power source 5 is stored in the reactor of the three-phase motor 4 that is connected to the switching element of the lower arm in ON state. Then, when the switching element of the lower arm in ON state is turned off, the energy stored in the reactor is supplied to the capacitor 2 through the switching element of the upper arm paired with the switching element of the lower arm in OFF state and stored in the capacitor 2. Thus, the three-phase motor 4 is driven by three-phase AC power supplied from the inverter circuit 3 in addition to the DC power component from the DC power source 5 so that the electric potential at the neutral-point of the three-phase motor 4 is lower than that of the DC power source 5. Therefore, the current flows at the neutral-point of the three-phase motor 4 in the same direction as the discharging direction of the DC power source 5, and the capacitor 2 is charged with the energy from the DC power source 5. In addition, the three-phase motor 4 is driven by the three-phase AC power supplied from the inverter circuit 3 in addition to the DC power component from the DC power source 5 so that the electric potential of the neutral-point of the three-phase motor 4 is higher than that of the DC power source 5. In this case, current flows in the same direction as the charging direction of the DC power source 5 at the neutral-point of the three-phase motor 4, and the DC power source 5 is charged with the energy from the capacitor 2.

The DC to three-phase AC inverter system 1 of the preferred embodiment of the present invention may convert the DC power from the capacitor 2 into the three-phase AC power and supply the three-phase AC power to the three-phase motor 4 while increasing the voltage of the DC power source 5 to charge the capacitor 2. Thus, there is no need to provide a booster circuit or a buck circuit in the DC to three-phase AC inverter system 1 other than the inverter circuit 3, so that the DC to three-phase AC inverter system 1 may be downsized.

The following will describe the control circuit 8 in detail. The control circuit 8 includes a rotational speed calculator 16, a 3-2 axes converter 17, a voltage command generator 18, a converter 19 and drive signal generators 20, 21. The cycle of generating drive signals Su, Sv, Sw by the control circuit 8 is substantially equal to or longer than half of cycle of a triangle wave for generating the drive signals Su, Sv, Sw. The rotation angle sensor 6 detects the rotational angle 6 of the rotor of the three-phase motor 4. The current sensor 7 detects currents Iu, Iv, Iw flowing through the U-phase, the V-phase and the W-phase of the three-phase motor 4 and current Idc flowing at the neutral-point of the three-phase motor 4. The current sensor 7 may be adapted to detect three of the four currents Iu, Iv, Iw, Idc, and the fourth current may be determined by calculation.

The rotational speed calculator 16 calculates the rotational speed ω of the rotor of the three-phase motor 4 based on the rotational angle θ of the rotor of the three-phase motor 4 and the time of the driving the three-phase motor 4. The 3-2 axes converter 17 converts the currents Iu, Iv, Iw into two current components including current Id flowing in the same direction as that of the magnetic field of the three-phase motor 4 and current Iq flowing in the direction perpendicular to that of the magnetic field of the three-phase motor 4.

The voltage command generator 18 includes a current controller 22 and a 2-3 axes converter 23. The current controller 22 generates voltage commands Vd, Vq based on the rotational speed ω the currents Id, Iq and a torque command T from an external circuit, such as an control circuit on the upper side of the DC to three-phase AC inverter system 1.

Specifically, using a table storing data representing the relation between current commands Id*, Iq* and the torque command T, the current controller 22 determines the current commands Id*, Iq* from the torque command T. The current controller 22 determines the difference Δ Id between the current command Id* and the current Id and the difference Δ Iq between the current command Iq* and the current Iq.

Then, the current controller 22 determines by propotional-integral (PI) control such voltage commands Vd, Vq that make each value of the differences Δ Id, Δ Iq zero. For example, the voltage commands Vd, Vq are determined according to the Equations 1, 2 below.

$$Vd = Kp \times \Delta Id + \int(Ki \times \Delta Id) - \omega Lq Iq \quad \text{Equation 1}$$

$$Vq = Kp \times \Delta Iq + \int(Ki \times \Delta Iq) - \omega Ld Id + \omega Ke \quad \text{Equation 2}$$

In the above equations 1 and 2, Kp represents a constant of proportion, Ki represents a constant of integral, Ld represents a d-axis inductance, Lq represents a q-axis inductance, Id represents a d-axis current, Iq represents a q-axis current, and Ke represents a constant of inductive voltage. The 2-3 axes converter 23 converts the voltage commands Vd, Vq into voltage commands Vu, Vv, Vw for the U-phase, the V-phase and the W-phase, respectively.

The converter 19 determines voltage commands Vu*, Vv*, Vw* based on boost command V* and the voltage commands Vu, Vv, Vw. The boost command V* is a voltage command value for making zero the difference between the desired voltage of the capacitor 2 inputted from the external circuit and the measured voltage of the capacitor 2. The converter 19 selects one of the currents Iu, Iv, Iw which has the greatest negative value, and outputs to the drive signal generator 20 one of the voltage commands Vu*, Vv*, Vw* for the one phase of the selected current, and outputs to the drive signal generator 21 the voltage commands for the other phases. For example, referring to FIG. 2, in the region E1 of angular positions θ of the three-phase motor 4 where the current Iu has the greatest negative value, the voltage command Vu* is outputted to the drive signal generator 20, and the voltage commands Vv*, Vw* are outputted to the drive signal generator 21. In the region E2 shown where the current Iv has the greatest negative value, the voltage command Vv* is outputted to the drive signal generator 20, and the voltage commands Vu*, Vw* are outputted to the drive signal generator 21. In the region E3 where the current Iw has the greatest negative value, the voltage command Vw* is outputted to the drive signal generator 20, and the voltage commands Vu*, Vv* are outputted to the drive signal generator 21.

The drive signal generator 20 generates to the drive circuit 9 a drive signal through comparing one of the voltage commands from the converter 19 with the triangle wave T1 as a drive signal for one phase of the compared voltage command from the converter 19. For example, the drive signal generator 20 generates to the drive circuit 9 a drive signal of a high level when the voltage command Vu* is greater than the triangle wave T1 and a drive signal of a low level when the voltage command Vu* is smaller than the triangle wave T1 as the drive signal Su for the U-phase.

The drive signal generator 21 generates to the drive circuit 9 two drive signals through comparing the other two of the voltage commands from the converter 19 with the triangle wave T2 as a drive signal for each of two phases of the voltage commands from the converter 19. For example, the drive signal generator 21 generates a drive signal of a high level when the voltage command Vv* is greater than the triangle wave T2 and a drive signal of a low level when the voltage command Vv* is smaller than the triangle wave T2. Then, the generated drive signal is outputted to the drive circuit 9 as the drive signal Sv for the V-phase. The drive signal generator 21 generates a drive signal of a high level when the voltage command Vw* is greater than the triangle wave T2 and a drive signal of a low level when the voltage command Vw* is smaller than the triangle wave T2. Then, the generated drive signal is outputted to the drive circuit 9 as the drive signal Sw for the W-phase.

It is noted that the frequency of the triangle wave T1 is lower than that of the triangle wave T2. Thus, the frequency of the drive signal for one phase through which the current having the greatest negative value flows may be decreased to a level lower than those of the drive signals for the other phases, so that the switching frequency of the switching elements for the one phase through which the current having the greatest negative value may be decreased. As a result, switching loss of the DC to three-phase AC inverter system 1 may be reduced.

The drive circuit 9 generates the drive signals S1 through S6 by using the drive signals Su, Sv, Sw generated by the drive signal generators 20, 21 to the corresponding the switching elements 10 through 15, respectively. For example, the drive circuit 9 outputs to the switching element 10 a drive signal equal to the drive signal Su as the drive signal S1 and to the switching element 11 a drive signal generated by inverting the drive signal Su as the drive signal S2. The drive circuit 9 outputs to the switching element 12 a drive signal equal to the drive signal Sv as the drive signal S3 and to the switching element 13 a drive signal generated by inverting the drive signal Sv as the drive signal S4. The drive circuit 9 outputs to the switching element 14 a drive signal equal to the drive signal Sw as the drive signal 85 and to the switching element 15 a drive signal generated by inverting the drive signal Sw as the drive signal S6.

According to the preferred embodiment of the present invention, as previously mentioned, the frequency of the triangle wave T1 is set lower than that of the triangle wave T2 and, therefore, the switching loss may be reduced. In addition, the frequency of the triangle wave T1 should preferably be set such that a zero-phase current ripple made by combining the switching ripples of the respective phases is minimized as much as possible. In general, the switching ripple is calculated by the Equation (3).

$$x_{triangle}(t) = \frac{8}{\pi^2} \sum_{k=1}^{\infty} \sin\left(\frac{k\pi}{2}\right) \frac{\sin(kt)}{k^2} \qquad \text{Equation (3)}$$

In the case of a basic wave where there is no phase shifting, the switching ripples of the respective phases are calculated by the Equations (4) through (6), respectively.

$$y_1 = A\sin\omega t \qquad \text{Equation (4)}$$

$$y_2 = A\sin\omega t \qquad \text{Equation (5)}$$

$$y_3 = \frac{A}{n}\sin(n\omega t) \qquad \text{Equation (6)}$$

A composite wave Y or the zero-phase current ripple made by combining the results of the Equations (4) through (6) is calculated by the Equation (7). In the Equation (6), n represents the frequency of the triangle wave T1.

$$Y = y_1 + y_2 + y_3 \qquad \text{Equation (7)}$$
$$= 2A\sin\omega t + \frac{A}{n}\sin(n\omega t)$$

The relation between the frequency n and amplitude of the composite wave Y is shown in FIG. 3. As shown in FIG. 3, in the region of n between 0.5 and 1, or when the frequency of the triangle wave T2 is half of that of the triangle wave T1, the amplitude of the composite wave Y is low enough to prevent the zero-phase current ripple from increasing. Thus, the controllability of the boost operation is prevented from being deteriorated. In a case that the zero-phase current ripple is desired to be decreased while preventing the switching loss from increasing, the frequency of the triangle wave T1 should be decreased to about half of that of the triangle wave T2.

According to the DC to three-phase AC inverter system 1 of the preferred embodiment of the present invention, the switching frequency of the switching elements for one phase is decreased to a level lower than those of the switching elements for the other phases, so that the switching loss is reduced and also that zero-phase current ripple is prevented from increasing effectively as compared to a case in which the switching frequencies of the switching elements for all three phases are decreased. Thus, the controllability of boost operation is prevented from being deteriorated. Because the switching frequency of the switching elements for one phase through which the current having the greatest value flows is set lower than those for the other phases, the effect of reducing the switching loss is improved as compared to a case in which the frequencies of the switching elements for the other phases are lower than that for the one phase.

The converter 19 according to the preferred embodiment of the present invention is configured such that the switching frequency of the switching elements for one phase through which the current having the greatest negative value flows is lower than those for the other phases. Alternatively, the switching frequencies of the switching elements for two phases through which the currents having the greatest and second greatest values flow may be set lower than that for the other phase. For example, in the regions E1, E2 where the current Iu has the greatest negative value and the current Iv has the second greatest negative value, the converter 19 outputs the voltage commands Vu*, Vv* to the drive signal generator 20 and the voltage command Vw* to the drive signal generator 21, respectively.

In the preferred embodiment of the present invention, the DC power source 5 is arranged between the neutral-point of the three-phase motor 4 and the lower arms of the switching elements 11, 13, 15. Alternatively, the DC power source 5 may be arranged between the neutral-point of the three-phase motor 4 and the upper arm of the switching elements 10, 12, 14. In this structure, the control circuit 8 controls the switching operation of the switching elements 10 through 15 such that the current flowing at the neutral-point of the three-phase motor 4 is offset to the positive. The converter 19 outputs to the drive signal generator 20 a voltage command for one phase through which the current having the greatest value among the currents Iu, Iv, Iw flows and generates to the drive signal generator 21 voltage commands for the other phases, or voltage commands for two phases through which the currents having the greatest and second greatest values among the currents Iu, Iv, Iw flow and generates to the drive signal generator 21 a voltage command for the other phase.

What is claimed is:

1. A direct-current to three-phase alternating-current inverter system comprising:
   a three-phase motor having U-phase, V-phase and W-phase;
   an inverter circuit for the three-phase motor;
   a plurality of switching elements arranged in the inverter circuit, the switching elements respectively serving as upper arms and lower arms for the respective three phases of the three-phase motor;
   a capacitor connected in parallel to the respective pairs of the upper arm and the lower arm;
   a direct-current power source arranged between the neutral-point of the three-phase motor and the respective lower arms or the respective upper arms; and
   a control circuit controlling switching operation of the switching elements such that a switching frequency of each switching element is changeable to a first frequency and a second frequency which is lower than the first frequency, in a region where current flowing through the U-phase has the greatest negative value among the currents flowing through the U-phase, the V-phase and the W-phase of the three-phase motor, the switching frequency of the switching element in U-phase is changed to the second frequency and the switching frequencies of the switching elements in V-phase and W-phase are changed to the first frequency, in a region where current flowing through the V-phase has the greatest negative value among the currents flowing through the U-phase, the V-phase and the W-phase of the three-phase motor, the switching frequency of the switching element in V-phase is changed to the second frequency and the switching frequencies of the switching elements in W-phase and U-phase are changed to the first frequency, and in region where current flowing through the W-phase has the greatest negative value among the currents flowing through the U-phase, the V-phase and the W-phase of the three-phase motor, the switching frequency of the switching element in W-phase is changed to the second frequency and the switching frequencies of the switching elements in U-phase and V-phase are changed to the first frequency,
   wherein the switching operation, controlled by the control circuit, conducted during one of two states, consisting of a state when switching actions take place and a state when no switching actions take place,
   in the state when switching actions take place, the control circuit controls the switching operation of the switching elements such that the switching frequency of the switching elements of the greatest negative current value in one of the U-phase, the V-phase and the W-phase is lower than the switching frequencies of the switching elements in the other ones of the U-phase, the V-phase and the W-phase.

2. The direct current to three-phase alternating-current inverter system according to claim 1, wherein the control circuit controls the switching operation of the switching elements such that the switching frequencies of the switching elements of the greatest negative current value and the second greatest current value in two phases are lower than the switching frequency of the switching elements in the other phase.

3. The direct current to three-phase alternating-current inverter system according to claim 1, wherein the control circuit controls the switching operation of the switching elements such that at least the switching frequency of the switching elements of the greatest negative current value in one phase is half of the switching frequency of the switching elements in the other phases.

* * * * *